Figure 7:
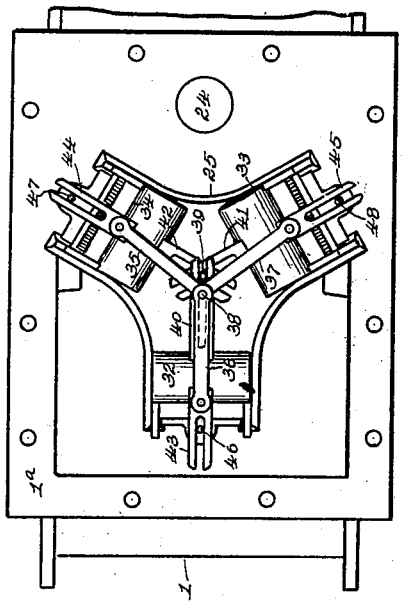

No. 722,389. PATENTED MAR. 10, 1903.
H. H. SPRAGUE.
GAS METER.
APPLICATION FILED MAY 24, 1901.
NO MODEL. 5 SHEETS—SHEET 1.
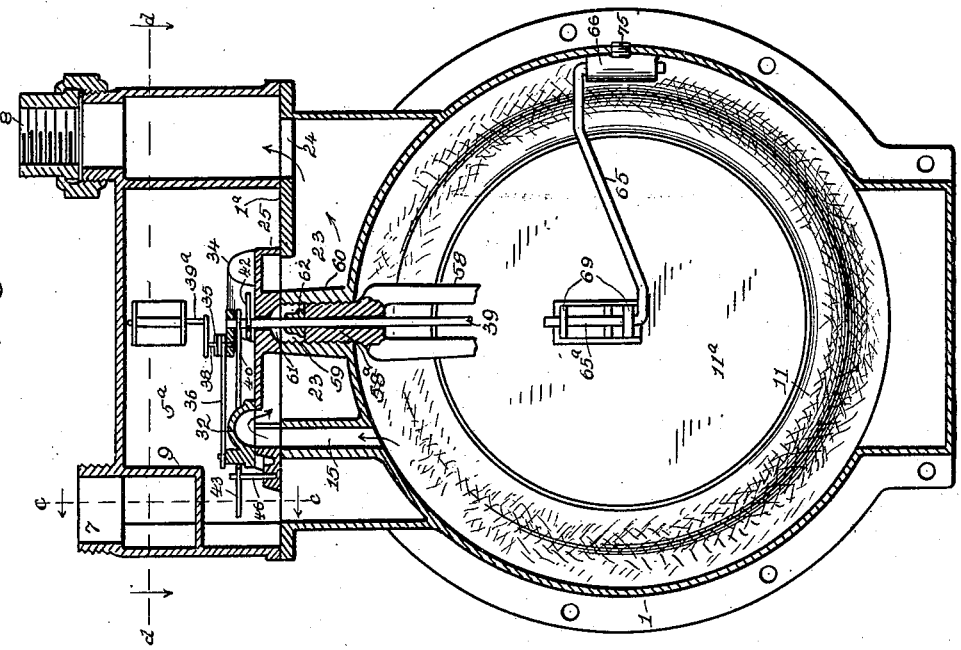
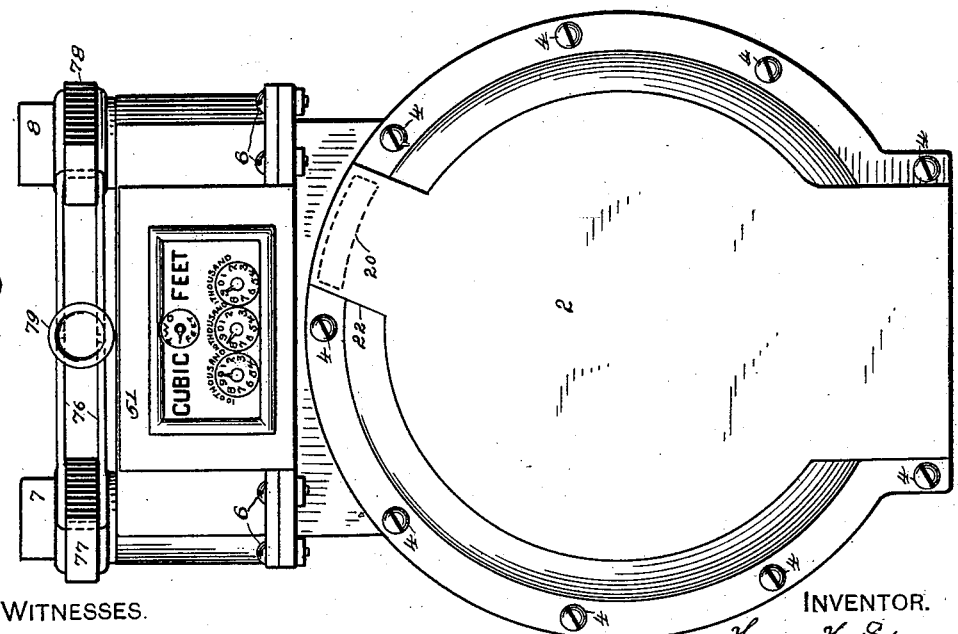
WITNESSES.
H. A. Lamb.
L. R. Hoyt.
INVENTOR.
Henry H. Sprague
By his Atty.
Geo. L. Phillips.

No. 722,389. PATENTED MAR. 10, 1903.
H. H. SPRAGUE.
GAS METER.
APPLICATION FILED MAY 24, 1901.
NO MODEL. 5 SHEETS—SHEET 2.
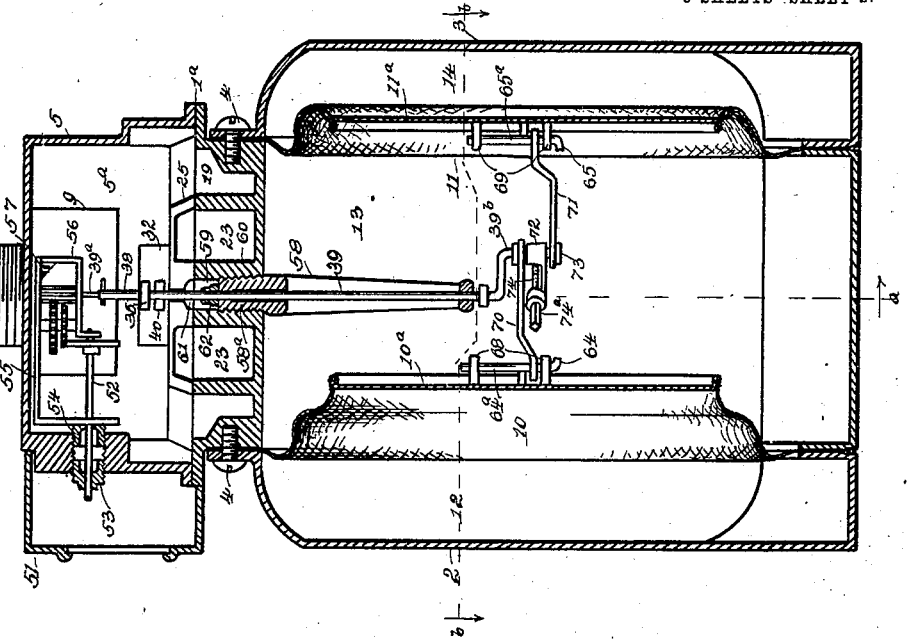
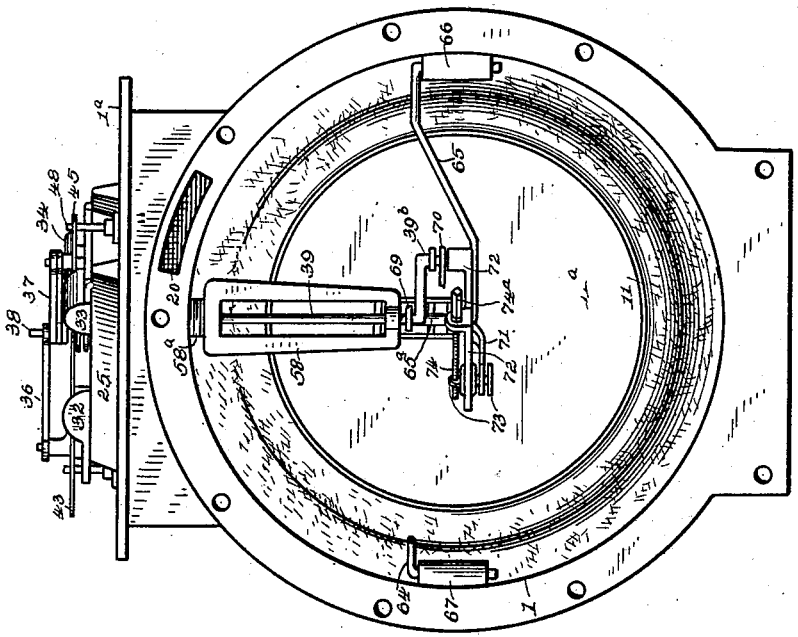
WITNESSES.
H. A. Lamb
L. R. Hoyt
INVENTOR.
Henry H. Sprague,
By his Atty.
Geo. D. Phillips No. 722,389. PATENTED MAR. 10, 1903.
H. H. SPRAGUE.
GAS METER.
APPLICATION FILED MAY 24, 1901.
NO MODEL. 5 SHEETS—SHEET 3.

WITNESSES.
H. H. Lamb.
L. R. Hoyt.

INVENTOR.
Henry H. Sprague
By his Atty.
Geo. L. Phillips.

No. 722,389. PATENTED MAR. 10, 1903.
H. H. SPRAGUE.
GAS METER.
APPLICATION FILED MAY 24, 1901.
NO MODEL. 5 SHEETS—SHEET 4.

WITNESSES. INVENTOR.
H. A. Lamb Henry H. Sprague.
L. R. Hoyt By his Atty.
Geo. D. Phillips.

No. 722,389. PATENTED MAR. 10, 1903.
H. H. SPRAGUE.
GAS METER.
APPLICATION FILED MAY 24, 1901.
NO MODEL. 5 SHEETS—SHEET 5.
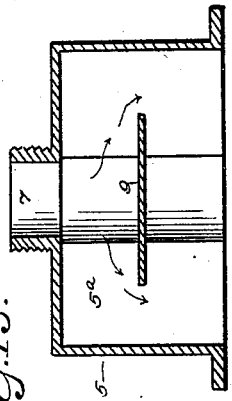
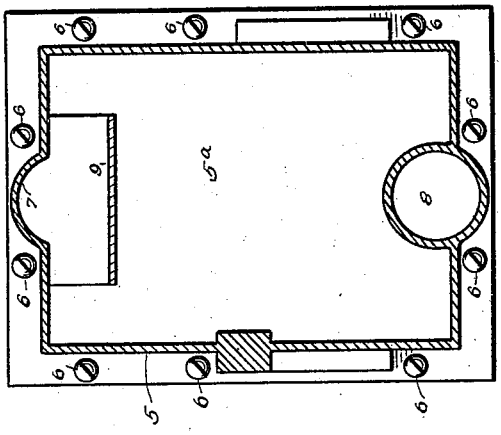
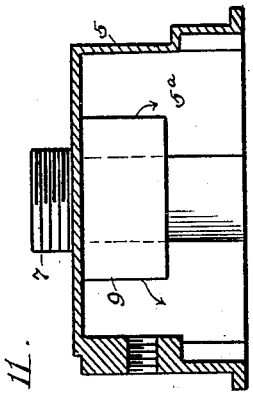
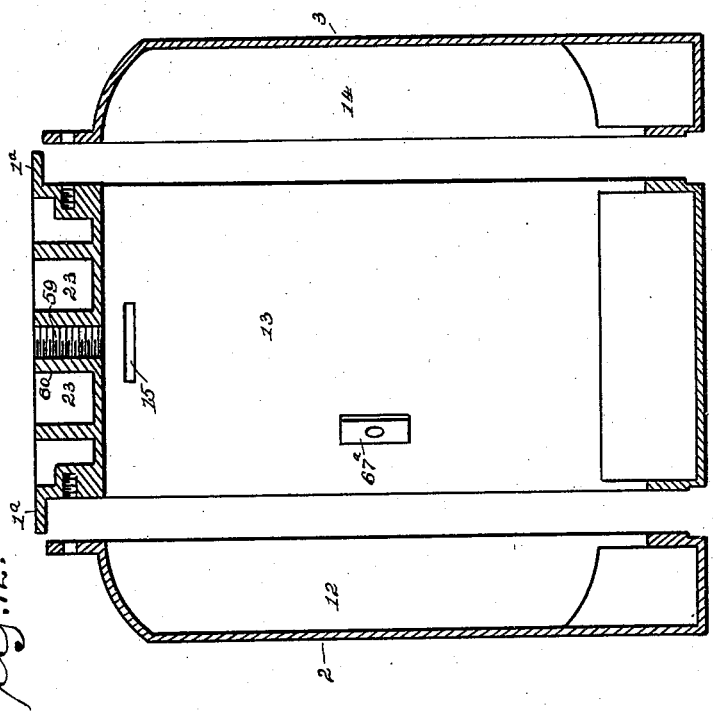
WITNESSES.
INVENTOR.
Henry H. Sprague
By his Atty.
Geo. I. Phillip

UNITED STATES PATENT OFFICE.

HENRY H. SPRAGUE, OF BRIDGEPORT, CONNECTICUT.

GAS-METER.

SPECIFICATION forming part of Letters Patent No. 722,389, dated March 10, 1903.

Application filed May 24, 1901. Serial No. 61,729. (No model.)

*To all whom it may concern:*

Be it known that I, HENRY H. SPRAGUE, a citizen of the United States, and a resident of Bridgeport, in the county of Fairfield and State of Connecticut, have invented certain new and useful Improvements in Gas-Meters, of which the following is a specification.

My invention relates to an improvement in gas-meters, and particularly to that class in which diaphragms are used to form chambers the vibrations of which are adapted to operate the valves opening and closing the inlet and outlet ports leading to the different chambers.

The object of my invention is to construct a meter having a cast-iron case and possessing great capacity in proportion to its size and weight, combined also with simplicity and cheapness of construction and repairs.

To this end my invention consists—

First, in constructing the cast-iron case in four distinct and removable parts—viz., the central body portion, the side covers therefor, and the cap—thereby forming when the diaphragms are in place four distinct compartments—viz., an upper gas-distributing chamber and three measuring-chambers.

Second, in the arrangement of three triangularly-placed slide-valves located in the distributing-chamber and grouped about the crank-shaft and radially operating therefrom, which so far as space is concerned is the most economical arrangement of slide-valves that can be devised. This economy of space admits of the general reduction of the size and weight of the meter.

While meters have heretofore been constructed with three measuring-chambers and two movable diaphragms, a rotary valve has been used which absorbs so much power that such a construction is practically of no value. Meters with three slide-valves and three measuring-chambers and a central crank-shaft have also been made, but always in connection with three diaphragms, in which construction there is a fourth chamber centrally located with respect to the measuring-chambers, which fourth chamber is a distributing-chamber. This causes the displacement to take place on one and the same side of each of the diaphragms it being constantly presented to the distributing-chamber in which there is absolutely no displacement. As this construction increases the number of vibrations for a given volume it also increases the wear and tear of the meter, and thereby shortens its life, and it also results in a loss of pressure. Such a construction is still further objectionable owing to its necessarily increased size and weight.

Third, in providing a central supporting-bracket carrying the journals and center alinement of the crank-shaft, whose upper end is threaded and screwed into a recess in the upper portion of the body, thus fastening the bracket securely in place. Above such threaded end is a chamber adapted to be filled with an oleaginous substance, both to lubricate the crank-shaft, which passes through said upper end, and also to effectually prevent leakage of gas around said shaft.

Fourth, in providing in a single piece a swinging carrier or bracket pivotally supported from the body of the meter and to the central portion of the diaphragms, whereby the diaphragms are maintained in a vertical position and their centers made to move in a fixed path.

Fifth, a double crank situated at the lower end of the crank-shaft and a link for connecting each crank with a diaphragm, means whereby the throw of one of the cranks is varied to increase or decrease the throw or travel of one diaphragm, and thereby vary the displacement sufficient to regulate the meter, thus avoiding the necessity of regulating both diaphragms through a common crank-shaft, which in this type of machine would not only increase the number of mechanical parts, and consequently the frictioned points, but the cost as well.

Sixth, means whereby the connections of the inlet and outlet openings to the meter are sealed to prevent the same being disconnected and tampered with.

So far as known, my construction, consisting, as before mentioned, of three measuring-chambers, three slide-valves, and only two diaphragms, the slide-valves situated above the measuring-chambers and grouped about the crank-shaft and moving in direct radial lines with respect thereto to produce the combined effect of minimum size and weight, minimum loss of power, and a maximum capacity, has never been in use.

The above advantages, together with others not heretofore mentioned, will be more particularly set forth in the following specification, and embodied in the claims to follow.

To enable others to understand my invention, reference is had to the accompanying drawings, in which—

Figure 8:
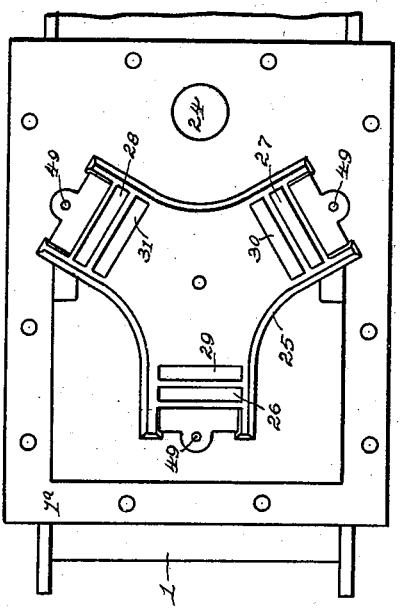
Figure 5:
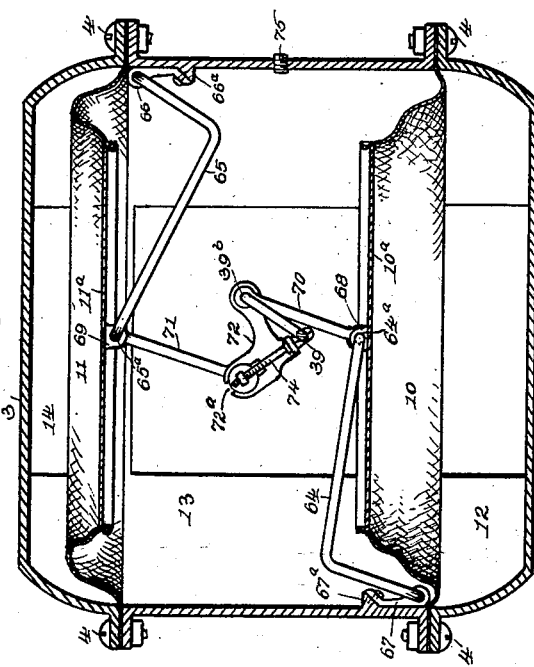
Figure 6:
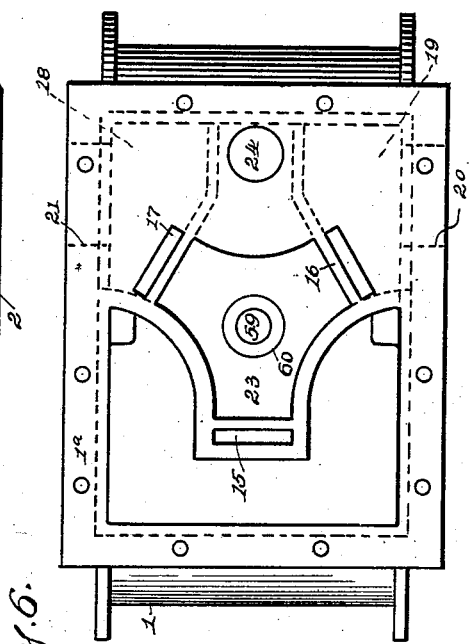
Figure 9:
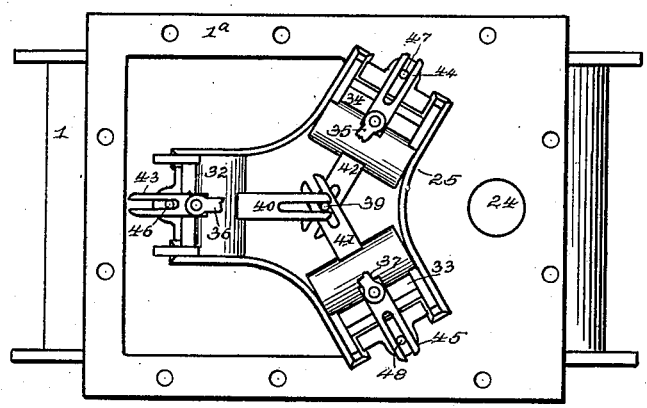
Figure 10:
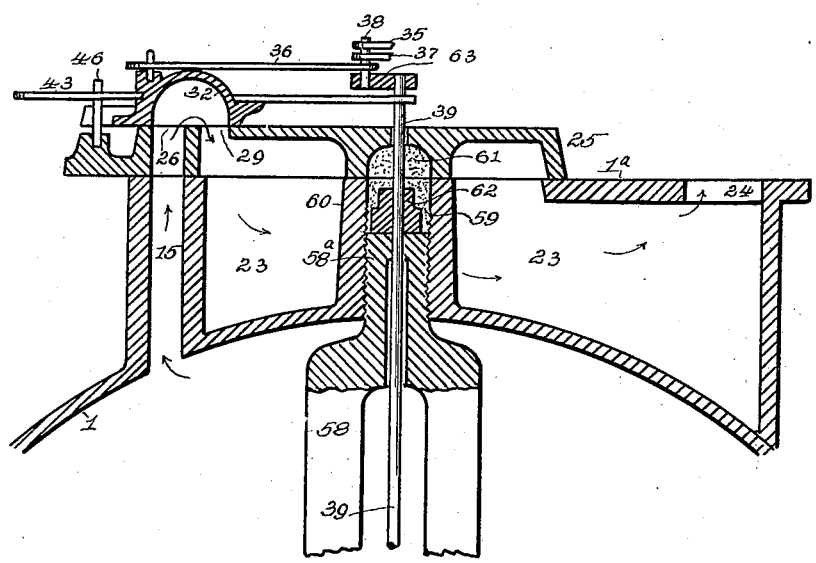

Figure 1 represents a front elevation of the meter. Fig. 2 is a sectional view of the distributing-chamber and central body portion of the meter through line $a$ of Fig. 4, also broken view, partly in section, of the crank-shaft bracket. Fig. 3 is a front elevation of the meter with one of the side covers and one of the diaphragms removed, and also the cap of the distributing-chamber, also broken view of the swinging brackets that maintain the vertical position of the movable part of one of the diaphragms, the other of said brackets shown in position. Fig. 4 is a central sectional view of the cap of the distributing-chamber, central body portion of the meter, and side covers, broken view of the diaphragm side brackets, and central sectional view of the crank-shaft bracket. Fig. 5 is a transverse section through line $b$ of Fig. 4. Fig. 6 is an upper plan view of the central body portion with the valve-plate removed. Fig. 7 is a broken upper plan view of the central body portion with the valve-plate and valves assembled on the horizontal portion of said central body. Fig. 8 is a view similar to Fig. 7 with the valves removed. Fig. 9 is an upper plan view of the central body portion of the meter with the valve-plate and valves thereon and broken view of the valve-links. Fig. 10 is a broken enlarged view, partly in section, of the upper part of the central body portion and the crank-shaft bracket. Fig. 11 is a cross-sectional view of the cap of the distributing-chamber, showing a fender adapted to prevent the meter being tampered with when disconnected. Fig. 12 is a cross central sectional view of the central body portion of the meter and the two side covers detached therefrom. Fig. 13 is a sectional view of the cap of the distributing-chamber and sectional view of the fender through line $c$ of Fig. 2. Fig. 14 is a sectional view of the cap of the distributing-chamber through line $d$ of Fig. 2.

Its construction and operation are as follows:

1 is the central body portion of the meter; 2 and 3, the removable recessed side covers secured to the body by means of the screws 4. 5 is the removable recessed cap of the distributing-chamber, and it is adapted to be secured to the flat surface $1^a$ by means of the screws 6.

7 is the inlet, and 8 the outlet. Immediately under the former and within the distributing-chamber $5^a$ is the fender 9, Figs. 2, 11, 13, and 14, which serves to prevent a wire or other instrument being inserted through the inlet 7 to tamper with the mechanism in the distributing-chamber when the meter is disconnected.

10 and 11 are flexible diaphragms of circular construction whose outer edges are firmly clamped between the side covers 2 and 3 and the central body. This arrangement of the diaphragms forms the three measuring-chambers 12, 13, and 14.

15, 16, and 17, Fig. 6, are ports in the face of the upper surface $1^a$ of the central body leading into these measuring-chambers. The port 15 (see also Figs. 2, 10, and 11) leads straight down into the central chamber 13, while the ports 16 and 17 open into the small corner chambers 18 and 19, from which the lateral opening or ports 20 and 21 lead into the measuring-chambers 12 and 14. One of these side ports 20 in the central body portion is shown at Fig. 3 and both are shown in dotted lines at Fig. 6. Immediately over these side ports or openings 20 and 21 there is provided a bulge or swell in the side covers, so as to form a passage for the gas into said side measuring-chambers. One of these swells 22 is shown at Fig. 1.

23, Figs. 2, 6, and 10, is the exhaust-chamber for all of the measuring-chambers. 24 is a port in the upper surface $1^a$, through which gas in said exhaust-chamber passes to the outlet 8, Fig. 2.

25, Fig. 8, is a valve-plate adapted to be secured to the upper surface $1^a$ and is provided with the ports 26, 27, and 28 to register with the ports 15, 16, and 17. (Shown at Fig. 6.) 29, 30, and 31 are exhaust-ports opening into the exhaust-chamber 23. With the exception of these six ports just mentioned this plate is solid, so as to form a tight cover for the exhaust-chamber 23.

32, 33, and 34, Figs. 7 and 9, are radially-operating slide-valves mounted on the valve-plate 25. 35, 36, and 37 are links connecting these valves with the crank-pin 38 (see also Figs. 2 and 10) of the crank-shaft 39. 40, 41, and 42 are guides attached to the inner end of the slide-valve, whose forked ends operatively embrace the said crank-shaft, so as to keep the forward ends of said valves in radial alinement. 43, 44, and 45 are other guides whose forked ends straddle the pins 46, 47, and 48, and thus serve to guide the outer ends of said valves. These pins are anchored in the holes 49, Fig. 8, of the valve-plate 25.

$39^a$, Figs. 2 and 4, being a continuation of the crank-shaft 39 above its crank portion, is connected with the clock mechanism. This mechanism being of a well-known construction needs no special description. There is, however, one feature connected with such mechanism which is of novel construction.

51, Fig. 4, is the case adapted to hold the revolution-counter. (Not shown in this view.)

52 is the shaft leading from the clock mechanism through the stuffing-box glands 53 and 54 in the side wall of the cap 5 of the distributing-chamber.

For cheapness and simplicity of construction the frame for the clock mechanism is made in two parts—viz., the upper part 55 and the lower part 56. The stuffing-box gland 54 is made integral with the vertical leg of said upper part, while the vertical leg of the lower part of said frame is joined by soldering or otherwise secured to the outer end of the horizontal portion of said upper part. 57 is a corner-piece adapted to give support to said joint, thereby making a cheap, effective, and easily-assembled frame, easily fastened in place, and at the same time carrying the journals and alinement of the crank-shaft passing through the stuffing-box.

The crank-shaft 39 is supported in the upper and lower ends of the vertically-hanging bracket 58, Figs. 3 and 4. The upper end 58$^a$ (see also Fig. 10) of this bracket is threaded and is screwed into the threaded hole 59, formed through the boss 60, which boss is integral with the central body portion 1 and projects within the exhaust-chamber 23. The meeting faces of the horizontal surface 1$^a$ of the central body 1 and the valve-plate 25 are gas-tight. 61 is a recess in the bottom of said plate to match the hole 59, and thus form a chamber between the upper end of the bracket 58 and the bottom of said recess. This chamber is filled with an oleaginous substance, which not only forms a tight joint about the crank-shaft, but also acts as a lubricant for said shaft. In this way an easy moving gas-tight joint is made and the necessity of packing the valve-rod or using a stuffing-box is done away with. To still further reduce the friction of the moving parts, especially those connected to the crank-shaft within the measuring-chamber, presently to be described, the whole weight of said crank-shaft is supported on the end of the bracket by means of the collar 62 of said shaft resting thereon.

The mechanism in the distributing-chamber can readily be detached from the crank-shaft without disturbing the mechanism in the measuring-chamber 13. In like manner the diaphragms and mechanism in chamber 13 can be repaired without disturbing the mechanism of the distributing-chamber.

In order to secure a correct measurement and properly utilize the pressure required to run the mechanism, it is necessary that the diaphrams 10 and 11 should travel in a fixed path. To secure this, the plates 10$^a$ and 11$^a$, to which the inner edges of the diaphragms are attached, must be kept from being pushed up or down or to one side by the thrust and pull of the links connecting said plates with the diaphragms. This is accomplished by means of the wire brackets 64 and 65. (Shown at Figs. 2, 3, 4, and 5.) One end of these wire brackets is journaled in the bearings 66 and 67, attached to lugs 66$^a$ and 67$^a$, projecting from the interior wall of the central body 1. The opposite and vertical ends 64$^a$ and 65$^a$ of these brackets are journaled in the ears 68 and 69, attached to the inside surface of the central plates 10$^a$ and 11$^a$ of the diaphragms. These ears are set far enough apart on each of said plates to keep said plates from tilting forward or back. The lower ears carry the weight of the plates and the greater part of the weight of the flexible diaphragms, and thus obviate any tendency of said diaphragms to sag. Connecting these wire brackets to the diaphragm-plates and within the central chamber instead of on the outside, as heretofore, still further reduces the size of the meter without detracting from its efficiency. The vertical ends 64$^a$ and 65$^a$ of said wire brackets also form supports, to which one end of each of the connecting-links 70 and 71 is journaled. The opposite end of link 70 is journaled to the lower crank-arm 39$^b$ of the crank-shaft.

72 (see more particularly Fig. 5) is a double-arm crank-plate rigidly secured by one of its arms to the crank-arm 39$^b$ of the crank-shaft, while the other arm has the slot 72$^a$ to receive the movable stud 73. The lower end of this stud, Fig. 3, serves as a connecting-point for the inner end of the link 71. 74 is an adjusting-screw engaging with the upper end of said stud, so as to move said stud back and forth in the slot 72$^a$, and thereby lengthen or shorten the travel or vibration of the diaphragm 11, and thus regulate the registering of the flow of gas through the meter. The angular position of the crank-plate 72 with respect to the crank-arm 39$^b$ of the crank-shaft is such that when one is on the center the other will be exerting a turning tendency. The angular position of the crank mechanism in the measuring-chamber 13 must bear a certain fixed relation to the angular position of the valves in the distributing-chamber, and the travel or opening and closing of said valves must be coincident with the varying vibrations of the two diaphragms.

The adjusting-screw 74 has the squared end 74$^a$, to which a wrench is applied to adjust the position of the stud 73. This may be done even when the meter is completed and in running order by removing the screw 75, Fig. 5, in the side wall of the body 1 and inserting the wrench.

The operation of the meter is as follows: The gas enters the distributing-chamber 5$^a$ through the inlet 7 and is conveyed from said chamber to the several measuring-chambers. When, therefore, the gas is filling the measuring-chambers 12 and 14, the middle chamber 13 is exhausting, as shown at Figs. 2 and 10, and vice versa.

76, Fig. 1, is a wire passed through holes (not shown) in the nuts 77 and 78 of the inlet and outlet connections, whose free ends are secured by the seal 79, which effectually prevents the meter being disconnected for the purpose of illegitimately tampering with it in any way.

From the foregoing description it will readily be seen that the advantages heretofore set forth—viz., reduced size and weight, simplicity of construction, whereby repairs and adjustments can easily be made, combined with accurate measurement and general efficiency—are fully maintained.

Having thus described my invention, what I claim as new, and desire to secure by Letters Patent, is—

1. The herein-described improvement in gas-meters which consists of a central body having a bore extending transversely therethrough, flange-faces on each side of said central body, a gas-distributing chamber above said central body, ports leading therefrom to said flange-faces, side covers adapted to rest against said flange-faces and provided with passage-ways to register with said ports.

2. The combination, in a gas-meter, of the four-part shell constructed as follows: a central body having a bore extending transversely therethrough, flange-faces on each side of said central body, a valve-seat, a cover overlying the same to form a gas-distributing chamber, ports leading therefrom to said flange-faces, concave side covers removably secured to said flange-faces, passages in said covers to register with the ports in said flange-faces, for the purpose set forth.

3. In a gas-meter of the character described, comprising, in combination, a central body having a circular bore transversely therethrough, recessed side covers removably secured to said central body as shown, two flexible measuring-diaphragms held to said central body by said covers thereby forming three measuring-chambers, viz: one in each of said recessed side covers and the third in said central body between said diaphragms, a flat upper surface on said central body, valve-ports therethrough leading into said measuring-chambers, a valve-plate carrying ports and overlying the ports in the central body, slide-valves operatively mounted thereon, a removable recessed cap adapted to inclose said valves and thereby form a gas-distributing chamber above said valves, a crank-shaft extending into said distributing-chamber and the central measuring-chamber, said slide-valves grouped about said shaft and adapted to operate radially to and from said shaft, for the purpose set forth.

4. The combination, in a gas-meter of the character described, consisting of a central body having a bore transversely therethrough, recessed side covers removably secured to said central body, two diaphragms secured to said central body by means of said side covers so as to form three measuring-chambers, as shown, a recessed cap carrying the recording mechanism and removably attached to said central body and also carrying the inlet and outlet for the meter, said recessed cap forming a distributing-chamber above the measuring-chambers, a crank-shaft whose lower end extends into the central measuring-chamber and whose upper end projects within the said distributing-chamber, triangularly-arranged slide-valves about said crank-shaft and radially operating to and from said shaft, ports opening from said valves into the measuring-chambers, for the purpose set forth.

5. The herein-described gas-meter, comprising, in combination with three measuring-chambers and two diaphragms arranged as shown, and a crank-shaft and means for connecting said shaft with said diaphragms, of three triangularly-arranged slide-valves grouped about said shaft and radially operating to and from the same, ports leading from said valves to the measuring-chambers, means whereby the inner ends of said valves are guided on said crank-shaft, and means substantially as shown for guiding the outer ends of said valves, for the purpose set forth.

6. The combination, in a gas-meter having three measuring-chambers and two movable diaphragms and a central crank-shaft adapted to be operated by said diaphragms, of a bracket depending into the central one of said measuring-chambers and from the upper wall thereof, said bracket having an upper extension to form a combined guide and bearing for said crank-shaft, combined with a combined guide and bearing for said shaft at the lower end of said bracket, for the purpose set forth.

7. A gas-meter, comprising, in combination, a central hollow body, removable recessed side covers and two diaphragms arranged so as to form three measuring-chambers, a recessed cap adapted to form a distributing-chamber, said cap removably secured to the upper surface of the central body, triangularly-arranged ports in said surface leading into the measuring-chambers, a valve-plate carrying slide-valves covering said ports, a crank-shaft centrally located with respect to said valves, said valves having a radial movement to and from said shaft, an exhaust-chamber formed in the upper surface of said central body and covered by said valve-plate, a projection having a threaded hole therethrough, said projection integral with the upper surface of said central body and projecting into said exhaust-chamber, a supporting and guiding bracket for said crank-shaft whose upper threaded end is adapted to be removably secured in said hole, a chamber adapted to hold an oleaginous substance located between the upper end of said bracket and the under side of the valve-plate, for the purpose set forth.

8. The combination, with the three measuring-chambers located and arranged as described, of the crank-shaft centrally located with respect to the central measuring-chamber, a removable supporting-bracket for said shaft located in the upper surface of said central chamber, crank-arm 39$^b$ below said bracket, double-arm crank-plate 72 rigidly secured by one of its arms to said crank-arm 39$^b$, the other arm slotted and carrying the movable stud 73, adjusting-screw 74 connected with said stud whereby the travel of one of the diaphragms is regulated, wire brackets 64 and 65 whose outer ends are journaled in fixed supports or bearings projecting from the interior walls of the central measuring-chamber, ears 68 and 69 projecting from the plates 10$^a$ and 11$^a$ of the diaphragms and within said central measuring-chamber, the inner vertical ends of said wire brackets journaled in said ears, link 71 journaled on the vertical end 65$^a$ of the wire bracket 65, the opposite end of said link journaled on the movable stud 73, link 70 journaled on the vertical end 64$^a$ of the wire bracket 65 and to the crank-arm 39$^b$ of the crank-shaft, for the purpose set forth.

9. The improvement, in the herein-described three-measuring-chambered gas-meter having two diaphragms and a crank-shaft depending into the central measuring-chamber and having a crank-arm at its lower end, of a double-arm crank-plate rigidly secured by one arm to the crank-arm of said shaft, the other arm of said crank-plate supporting a movable stud and an adjusting-screw whereby the travel of one of the diaphragms is increased or decreased, links for connecting said movable stud and the crank-arm of the shaft with the diaphragms, for the purpose set forth.

10. In a gas-meter, of the character described, the herein-described improvement connected with the recording mechanism, located in the distributing-chamber, which consists of the two-part movement-frame 55 and 56, the part 55 having the threaded stuffing-box gland 54 integral therewith, and adapted to enter a threaded hole in the side wall of said distributing-chamber, stuffing-box gland 53, said glands adapted to support shaft 52, for the purpose set forth.

11. The improvement, in the herein-described three-measuring-chambered gas-meter having two diaphragms, of swinging brackets adapted to support the central portion of said diaphragms and on the inside surface thereof and within the central measuring-chamber, the outer ends of said brackets journaled in supports projecting from the interior wall of said central measuring-chamber, for the purpose set forth.

12. The combination, in a gas-meter, of a four-part shell or frame, viz: a central body having a bore transversely therethrough, said central body having a flat upper surface to support valves, a recessed cap covering said upper surface and thus forming a distributing-chamber over the valves, two side covers to close said transverse bore, two diaphragms arranged to divide the meter into three measuring-chambers, one chamber in the said central body between the two diaphragms and the other two chambers between the said diaphragms and the two side covers, for the purpose set forth.

13. The combination, in a gas-meter having two flexible diaphragms, measuring-chambers, valves and a valve-connected crank-shaft centrally arranged with respect to said chambers and diaphragms, means whereby the meter is regulated through the medium of one of said diaphragms, said means consisting of a crank-plate secured to the crank portion of said crank-shaft, one diaphragm linked to said crank portion and the other linked to an adjustable part of said crank-plate, for the purpose set forth.

Signed at Bridgeport, in the county of Fairfield and State of Connecticut, this 23d day of May, A. D. 1901.

HENRY H. SPRAGUE.

Witnesses:
JOHN B. CLAPP,
WILLIAM J. MEYER.